United States Patent [19]

Hampl et al.

[11] Patent Number: 4,986,703

[45] Date of Patent: Jan. 22, 1991

[54] AUXILIARY CONTROL TECHNOLOGY FOR ROUTERS

[75] Inventors: Vladimir Hampl, Pleasant Plain; Ova E. Johnston, Franklin, both of Ohio

[73] Assignee: The United States of America as represented by the Department of Health and Human Services, Washington, D.C.

[21] Appl. No.: 345,317

[22] Filed: May 1, 1989

[51] Int. Cl.[5] .............................................. B23Q 11/02

[52] U.S. Cl. ...................................... 409/131; 51/273; 144/252 R; 408/56; 408/67; 408/241 G; 409/137

[58] Field of Search ................. 408/56, 61, 67, 241 G; 409/131, 137; 29/DIG. 78, DIG. 94; 144/251 R, 252 R; 83/98, 99, 100; 51/273

[56] References Cited

U.S. PATENT DOCUMENTS

| | | | |
|---|---|---|---|
| 345,610 | 7/1886 | Wood . | |
| 3,837,383 | 9/1974 | Ko . | |
| 3,913,642 | 10/1975 | Porter . | |
| 4,011,792 | 3/1977 | Davis . | |
| 4,037,982 | 7/1977 | Clement | 408/67 |
| 4,201,256 | 5/1980 | Truhan . | |
| 4,255,169 | 3/1981 | Leliaert et al. . | |
| 4,613,261 | 9/1986 | Maier et al. . | |
| 4,742,855 | 5/1988 | Hartley . | |
| 4,750,536 | 6/1988 | Grisley . | |

FOREIGN PATENT DOCUMENTS

| | | | |
|---|---|---|---|
| 563537 | 11/1932 | Fed. Rep. of Germany | 51/273 |
| 707629 | 5/1941 | Fed. Rep. of Germany | 51/273 |
| 2948475 | 6/1981 | Fed. Rep. of Germany | 408/61 |
| 3517677 | 1/1986 | Fed. Rep. of Germany | 51/273 |
| 1329716 | 9/1973 | United Kingdom | 144/252 R |

*Primary Examiner*—Daniel W. Howell
*Attorney, Agent, or Firm*—Lowe, Price, LeBlanc, Becker & Shur

[57] ABSTRACT

A dust collecting assembly for use with a machine tool having a rotating tool bit, which includes means for applying a plurality of parallel jets of air in the direction of particles as they are removed from a workpiece by the tooling operation. The jets of air are directed to slow down the particles so that they may be removed by a vacuum exhaust system. In applying the method to multi-directional tooling operations a plurality of jets surround the entire work area and selected subgroups of the jets are activated which oppose the trajectory of removed particles as the direction of the tooling operation changes.

18 Claims, 5 Drawing Sheets

SOLENOID VALVE
8
SEGMENTED MANIFOLD
7
6
JET TUBE
BRUSH

AUXILIARY CONTROL TECHNOLOGY FOR ROUTERS

TECHNICAL FIELD

This invention relates to a waste removal attachment for machine tools and more particularly it relates to an assembly of jet strippers that function in cooperation with local exhaust and brush assemblies of machine tools to capture and remove dust and debris from a work surface.

BACKGROUND ART

Machine tools used today such as routers, milling machines, drill presses, etc. generate a great deal of waste in the form of dust and large quantities of work chips and other materials when they cut into a workpiece. Disposal of the waste including sawdust, chips, and the like can be very difficult to carry out. The waste is a nuisance both on a work shop floor and, particularly, when the machine tool is being used in an area other than a workshop where the production of dust is even less desirable.

Wide broadcasting of the waste material produced by machine tools can, for some workpieces, be detrimental to the health of the operator of the machine as well as other workers in the immediate vicinity. Such waste products can also be dangerous since they tend to build up on the floor around the machine station, often causing the surface of the floor to become slippery and uncomfortable. Also, in the case of wood and other combustible workpieces, for example, a fire hazard may be created by waste such as sawdust.

Waste products generated during machine tooling operations can also be detrimental from an economic standpoint in that they often make it very difficult for the machine tool operator to view the workpiece since they often obstruct the operator's view of marked cutting lines, etc. The waste product can also get into the machinery itself and cause overheating and damage to the bearings, couplings, etc.

In the past, such machine tool operations have required either constant or frequent clean-up operations. In such cases, machinery is provided which positively removes the waste products from the immediate vicinity of the cutting or working tool. In most instances, such removal is accomplished by compressed air which is directed across the surface of the worktable to blow the waste produced toward a waste receptacle area from which it can be removed more conveniently.

The current trend in industry is to improve the environment of the worker to insure that health hazards are minimized. In woodworking facilities this trend has been accomplished by collecting wood particles and dust utilizing a vacuum means located in the vicinity of the origin of the wood particles and dust, and disposing of such waste in a collection bin. For example, U.S. Pat. No. 4,201,256 to Truhan discloses a modified safety cover for a saw blade that functions as a vacuum collector in cooperation with a collector bin located beneath the sawtable, whereby sawdust generated on the top of the workpiece as well as the bottom of the workpiece will be drawn directly into a vacuum transport conduit. The vacuum transport conduit transfers the sawdust and woodchip particles to the collection bin.

Some power tools such as routers, sanders, grinders and other woodcutting tools have been provided with vacuuming devices which, in most cases, are directly attached to the tool in such a way that a large portion of the waste products of the workpiece are transferred to the vacuum system and thus removed. For example, U.S. Pat. No. 4,742,855 to Hartley discloses a router which is surrounded by a dust collector collar which is vertically positionable relative to the workpiece by means of a pneumatic system. In operation, a vacuum force is applied to the top portion of the dust collector collar and is used to draw air upwardly from the workpiece past the router motor to a factory dust extraction means. Hartley has found that the upward flow of air enables the use of a fanless electric motor for the router inasmuch as the upward flow of air aids in cooling the electric motor of the router.

U.S. Pat. No. 4,750,536 to Grisley discloses a waste attachment for a router which includes a housing assembly having a portion thereof which is slidably positionable to be in contact with the workpiece being routed. The housing assembly is connected to a vacuum source which withdraws and collects debris from the workpiece.

While the above prior art waste collecting means have contributed significantly to the problem of how to remove and contain waste produced by machine tools, they are nevertheless inefficient in a number of ways. They may, for example, obstruct the operator's view and make it difficult for him to operate the tool along marked cutting lines. Also, in such prior art devices the vacuum force is often applied along a plane which is substantially parallel to and intersects the plane of the tool bit. This causes the vacuum force to work in a more random fashion than is desired, resulting in at least some of the waste either entering into a continuous movement about the tool without withdrawal from the area. Therefore, expulsion is produced from around the tool and the vacuum device without delivery to the vacuum removal system. Alternatively, turbulent motion around the tool for a longer period of time than is desired is produced with a resultant poor visibility of the relationship between the tool and the workpiece.

U.S. Pat. No. 3,837,383 to Ko discloses a vacuum assembly for a router which is made from a transparent material so that the operator can easily view the operation of the router. Additionally, Ko positions this vacuum suction means to be along a tangent relative to the normal helical arc of the waste materials as they travel from the cutting tool. In this regard, Ko has attempted to take advantage of the projectile or centrifugal force of the waste in order to augment the vacuum force and capture the waste.

In a quite different approach than that taken by Ko, U.S. Pat. No. 4,011,792 to Davis discloses a rotary tool exhaust that utilizes auxiliary jet tubes to inflict changes of direction of chips or particles thrown off as they leave the rotor tool, causing them to become readily airborne in an exhaust system passing through the hood. In principle, Davis utilizes the jet tubes to cause the chips or other particles to be dispersed upwardly so that they can become airborne and more easily subjected to removal by the exhaust system provided.

Generally, the control technology used on computer control routers consist of a local exhaust hood and a round brush installed at the router head. Despite this control, and the above-discussed developments in the art, significant quantities of wooddust are admitted into the workroom, notably when a large diameter router bit is used and the wood is routed under its surface.

In such routing operations the wooddust is emitted at a very high velocity because of the high surface velocity of the rotating router bit. This velocity may reach speeds of up to 15,000 feet per minute depending on the router bit diameter. To control this dust, the exhaust has to overcome this velocity which is almost impossible or not feasibly achievable with standard exhaust systems. Further, when utilizing very high exhaust velocities, the exhaust air flow deforms the brush bristle arrangements by bending the bristles and reducing the control capacity of the brush. When the brush does not properly cover areas of the workpiece where most emissions originated, control of the wooddust by the brush in these areas is reduced and dust is emitted into the work area. The exhaust capture capability is further reduced by blockage of work particles created at the wood surface.

While there have been a number of proposals to remove the dust produced by tool machines, these prior proposals generally, have not met with widespread acceptance. The inventors' experience is that the prior proposals do not remove an adequate percentage of the chips or waste products produced. Thus, even though a waste device may be attached to and utilized in conjunction with a machine tool, it has heretofore been the case that an excess quantity of waste is still distributed into the work area.

The present invention is an improvement over prior known dust collecting systems associated with machine tools such as routers, milling machines, drill presses and the like, which utilizes a system of jet strippers to slow the wood particles by directing an air flow at a higher velocity than the wood particles against the direction of the wood dust emission. Additionally, particles are blown out of areas blocked by the wood surface which enables the exhaust to capture these particles without any significant increase in the exhaust velocity.

DISCLOSURE OF THE INVENTION

The present invention provides a high efficiency dust collecting assembly for use with machine tool that utilize rotating bits.

The present invention also provides a series of jet strippers that are utilized together in conjunction with an exhaust system of a dust collecting assembly of a machine tool to collect and remove work particles from the surface of a workpiece.

The present invention also provides a high efficiency dust collecting assembly for use with machine tools that operate in a single direction with regard to a workpiece.

The present invention also provides a high efficiency dust collecting assembly for use with multidirectional, computer controlled machine tools.

Still further, the present invention provides a method for trapping and removing work particles from a workpiece that is subjected to a tooling, routing, milling, or similar operation.

The present invention provides a dust collecting assembly for use with a machine tool having a rotating bit which comprises means for applying a plurality of jets of air along a direction that is substantially opposed to the trajectory of particles as they are removed by the rotating bit of the machine tool.

In the case of a machine tool that operates in a multidirectional manner, there is provided the plurality of air jet stripper tubes that substantially surround the work area and means for selectively applying air pressure to a subgroup of selected ones of the plurality of air jet stripper tubes, whereby jets of air may be applied in a proper direction relative to the trajectory of work particles removed during a tooling operation, depending on the movement of the machine tool.

BRIEF DESCRIPTION OF DRAWINGS

The present invention will now be described with reference to the annexed drawings, which are given by way of non-limiting examples only.

BEST MODE FOR CARRYING OUT THE INVENTION

Figure 1:
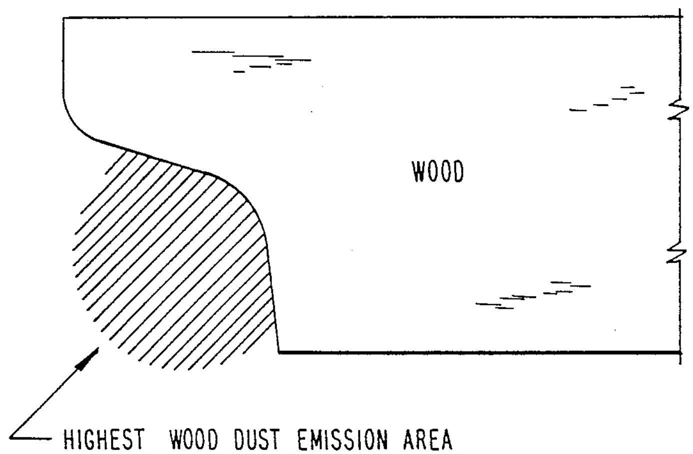
FIG. 1 is a diagram illustrating dust emission source in reference to an undercut routing procedure.
Figure 2A:
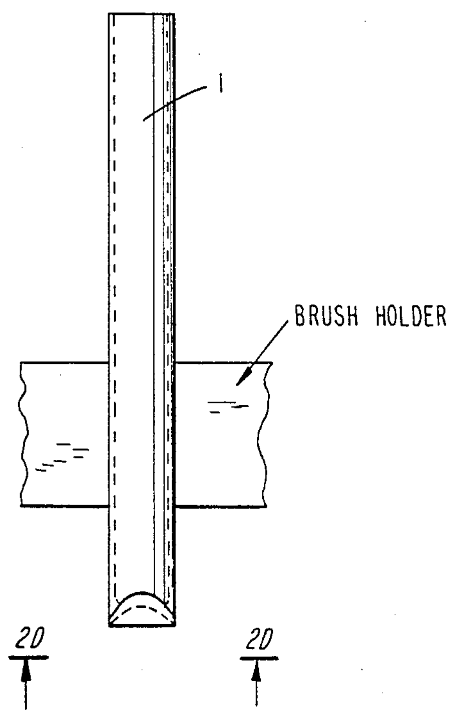
FIGS. 2A, 2B, 2C and 2D are diagrams illustrating one embodiment of the jet strippers used in conjunction with the present invention.
Figure 2B:
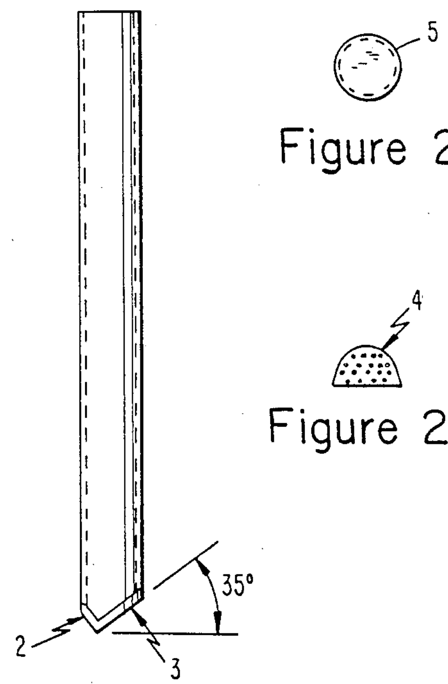
Figure 2C:
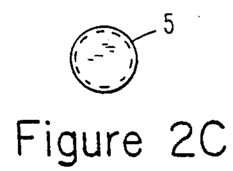
Figure 2D:
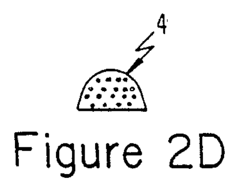

The present invention is particularly designed to control the emission of wood dust during machine tooling operations such as routing, milling and other operations utilizing a large diameter tool bit. The wood is removed from the surface of the work piece. One case where the wood is removed from under the surface is indicated in FIG. 1. To properly control dust emission, the present invention makes use of jet strippers which slow the wood particles down as they are removed by the operation of the machinery. This is done by directing air flow at a higher velocity than that of the wood particles opposed to the direction of the wood dust emission. Additionally, particles are blown out of the area blocked by the wood surface, as illustrated in FIG. 1, thereby enabling the exhaust hood to capture these particles without any significant increase in the exhaust velocity.

In designing the present invention to effectively operate in conjunction with the operation of the machinery, it was found necessary to design and develop at least two embodiments of the present invention. In this regard, inasmuch as the present invention utilizes air jets which necessarily oppose the direction of trajectory of particles as they are removed by a machining operation, it has been found necessary to appropriately change the direction of the applied air jet as the direction of the tooling operation changes. Therefore, while in a unidirectional machining operation, such as routing, the air jets can be properly aligned on the basis of the size of the tool bit or router bit. On the other hand, when the machine tool or router is utilized in a multi-directional mode of operation it was found necessary to enable the change of the applied direction of the air jets to be made dependent on the direction of trajectory of the wood particles which necessarily change as a consequence of the direction of the machining or routing operation.

Figure 3A:
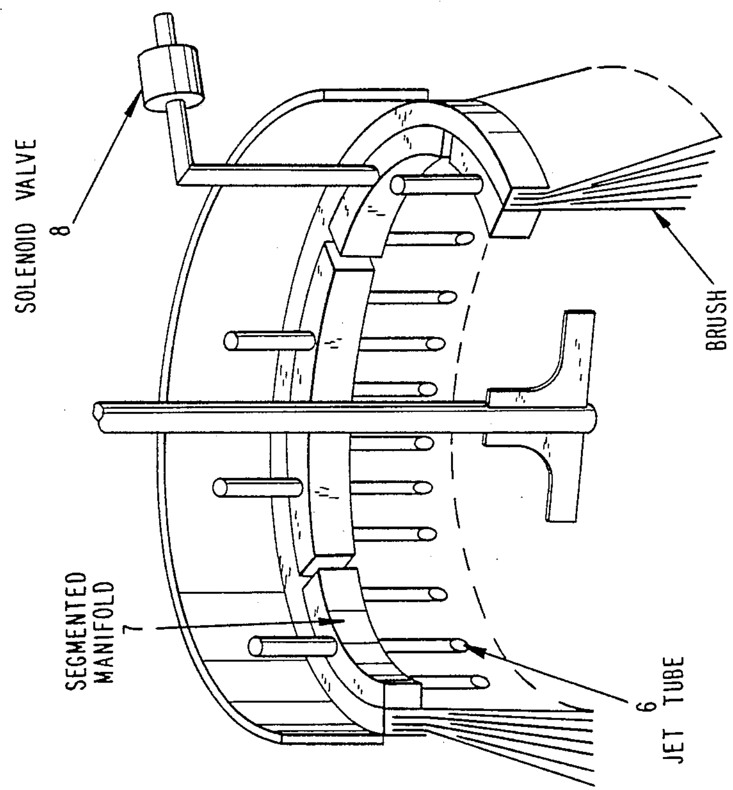
FIGS. 3*a* and 3*b* are a diagrams illustrating the location of the jet strippers of FIG. 2 in one preferred embodiment of the present invention.
Figure 3B:
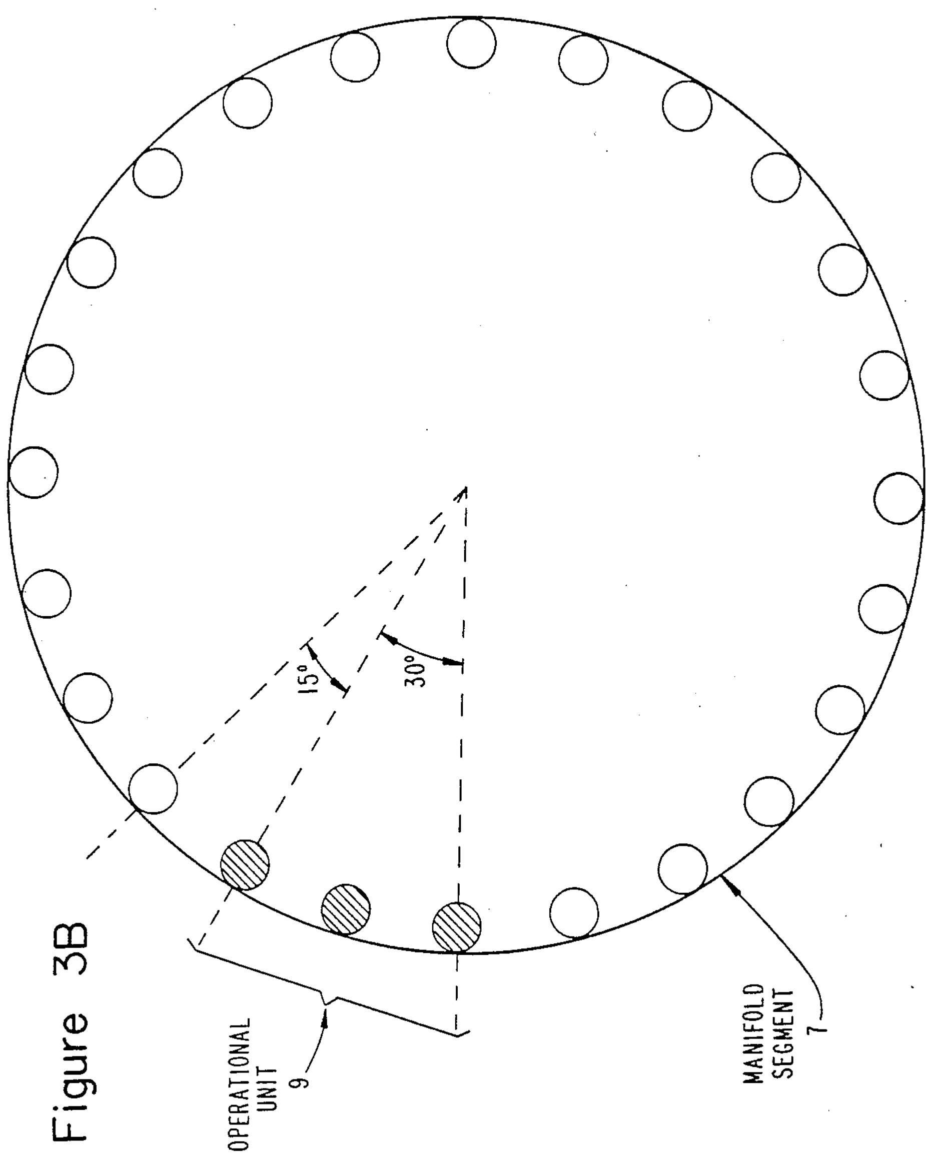
Figure 4:
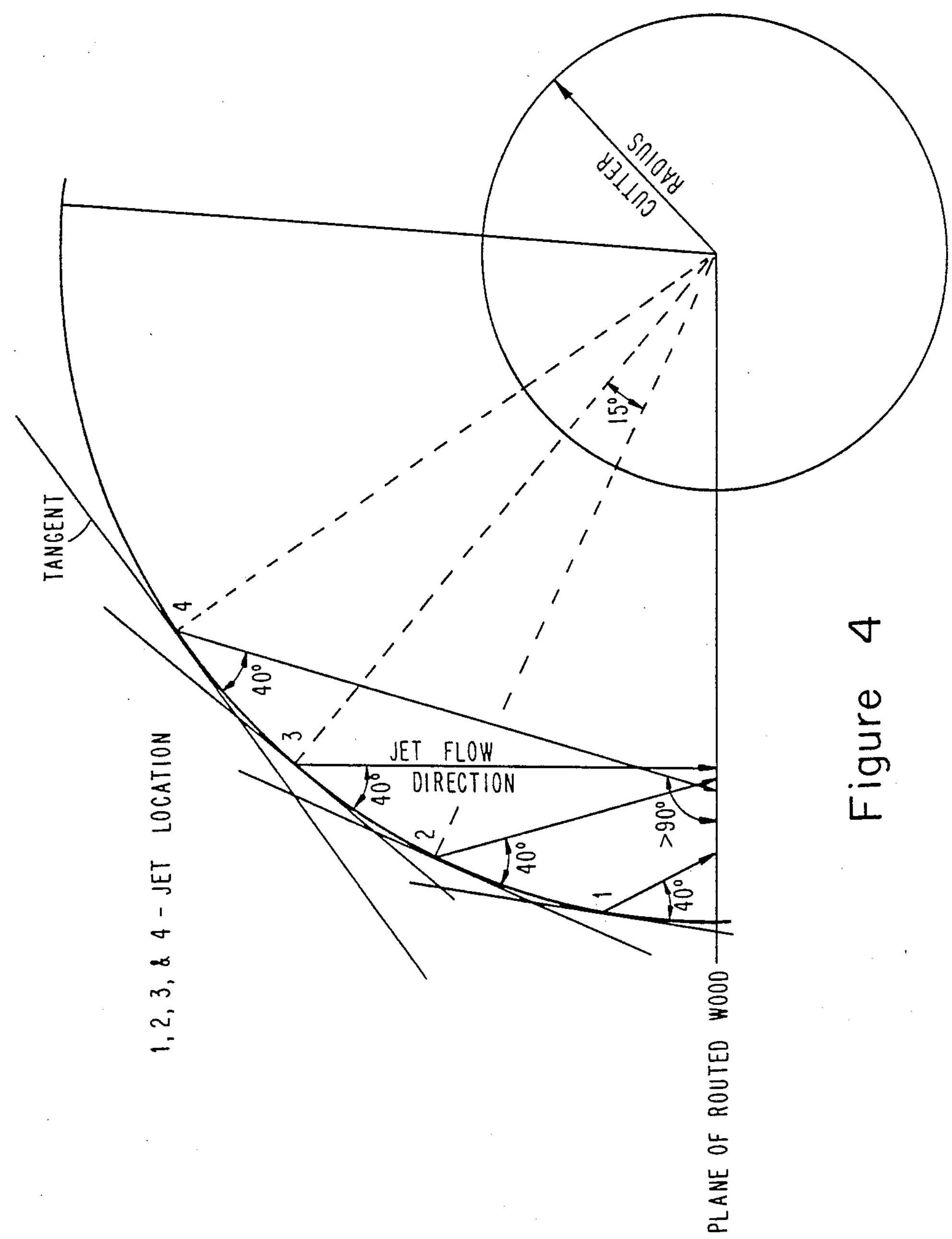
FIG. 4 is a diagram illustrating the air flow direction of the jet strippers illustrated in FIG. 3.

FIGS. 2 through 4 illustrate one embodiment of the present invention specifically designed for utilization in multi-directional machining or routing operations. In FIG. 2 the jet strippers to which air pressure is applied to produce the directed jets of air consist of tubular members which are supported in a conventional hood, bonnet or brush holder forming part of a vacuum exhaust of a router or machine tool.

As illustrated in FIG. 2 the jet strippers have an upper end (1) to which a suitable source of pressurized air may be applied and a lower end which depends from the illustrated brush holder which includes two opposed planar surfaces (2, 3) which are formed at predetermined angles whereby the jets of air may properly be directed at a downward angle onto a worktable from the planar face (3). The two opposed planar surfaces (2, 3) of the jet tubes are each sealed by a plate member. The plate member sealed to the planar face (3) includes a number of spaced-through holes therein, whereby pressurized air applied to the upper ends of the jet stripper tubes exits through the holes in the form of air jets.

As will be better understood as the description of the invention unfolds, the relative size, position and number of jet strippers used in each embodiment of the present invention, in order to be most effective, will be dependent on the size of the hood, bonnet or brush holder forming part of a vacuum exhaust. In an exemplary embodiment found to be useful for general routing purposes the jet strippers consist of round tubular members having outside diameters of approximately 0.375 inches and inside diameters of approximately 0.315 inches (5). The angle of the planar face (3) having the through holes (4) therein which forms the outlet end of the jet strippers should be aligned at an angle from of about 30 to about 70° from the horizontal. This angle, should be selected to properly direct the jets of air toward the work surface and tool or router bit. In the exemplary embodiment, when the tubes are positioned at approximately 1.75 inches from the work surface of the piece it is found that an angle of about 55° is effective to properly direct the air jets.

The opposed planar face (2), which is sealed as illustrated, can be aligned at any angle with the planar face (3) which provides a suitable surface area on the planar face (3) having the through holes (4) therein. In this regard, the through holes should be small enough to produce high velocity individual jets of air. For purposes of the present invention it has been found that the number of through holes should be chosen to give a ratio of feed cross-section area to the total jet hole area of approximately 5:1. For example, in an exemplary embodiment, the through-holes may have an inside diameter of approximately 0.035 inches and be spaced apart by approximately 0.05 inches.

As is noted above, the jet strippers of the exemplary embodiment utilize round tubular members having an inside diameter of approximately 0.315 inches and an outside diameter of approximately 0.375 inches (5). However, it should be apparent that the jet strippers could have different cross-sectional shapes such as square, rectangular, triangular, etc., and still be effective to produce the required jets of air.

FIGS. 3*a* and 3*b* show the location of the jet stripper tubes (6) as they should be positioned along the inside of the hood, bonnet or brush holder of a conventional machine tool or router exhaust or guard assembly. In order to operate effectively, the jet strippers must be located to substantially surround the work area and thus, the number of jet strippers is dependent on the size of the hood, bonnet or brush holder as well as the work area. In an exemplary embodiment found to be useful for general routing operations, 24 jet strippers are uniformly located as indicated in FIG. 3*b*. Jet strippers are combined into an operational unit (9) supplied with pressurized air via segmented manifold (7) and solenoid valve (8) resulting in manifolds and solenoid valves.

Pressurized air of approximately 25 PSI can be blown towards the worktable at approximately 40° from the tangent of the brush holder circular periphery, as illustrated in FIG. 4. Ideally, each individual stripper can operate separately in sequence with the movement of the worktable and the router head, but a combination of up to three jet strippers forming one operation unit supplied from one manifold (7) is found to be effective. A combination of four jet strippers is found to be unacceptable in the above exemplary embodiment because the fourth jet stripper blows air at an incident angle of over 90° as indicated in FIG. 4. This reduces the jet stripper system control capability and contributes to and increases dust emission. Of course, in larger units wherein a greater number of jet strippers uniformly located along the periphery of the brush holder are utilized it may be that four or more jet strippers can operate at an incident angle of under 90°. Moreover, while an air pressure of 25 PSI was found to be effective in the exemplary embodiment, acceptable operation is achievable in other embodiments utilizing air pressures of about 10 to 40 PSI.

In the illustrated embodiment, only one unit or group of jet strippers is operating at a time during routing. The others remain closed. The operation unit stays open until the routing plane is aligned approximately 15° with the air flow of the last jet stripper of the unit. Then, this unit is closed and the next unit which may include one or more additional jet strippers starts operating. The operation of the selected units or groups of jet strippers may be controlled by pneumatic valves receiving signals from a router computer which may further control the direction of the router operation.

Figure 6:
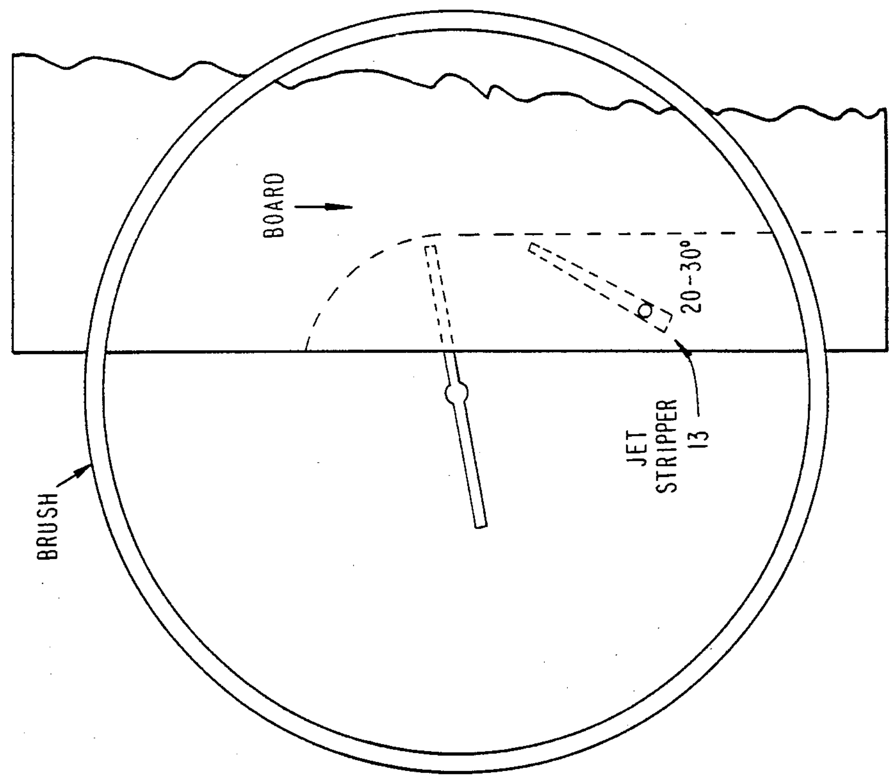
FIG. 6 is a diagram illustrating one arrangement of the jet strippers of FIGS. 5A–C in relationship to a typical workpiece.
Figure 5C:
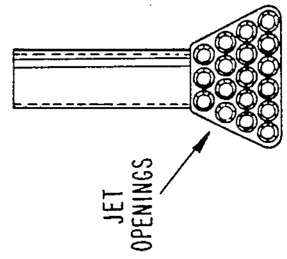
FIGS. 5A, 5B, and 5C are diagrams illustrating one embodiment of jet strippers for use in unidirectional routing operations.
Figure 5B:
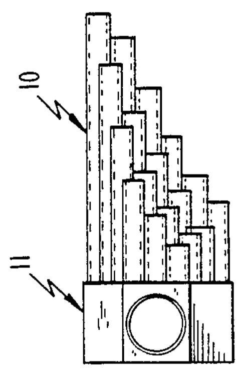
Figure 5A:
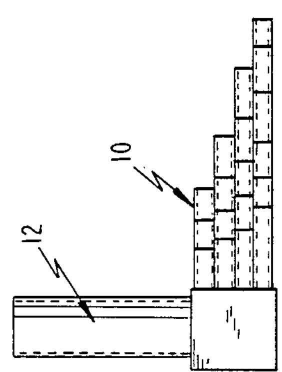

FIGS. 5 and 6 illustrate features of the present invention for use in unidirectional tooling or routing operations. For a standard or unidirectional routing operation, a single jet stripper is used (FIG. 5). This jet stripper consists of a number of nozzles (10) which together form an individual jet stripper unit, as illustrated in FIG. 5. These individual nozzles (10), which are connected to a manifold (11) at one end, have opposite ends which are preferably reduced or tapered to form outlet orifices. This single jet stripper unit is supported by an inlet tube (12) which connects to the manifold (11) as illustrated in FIG. 5. This inlet tube is supported in a suitable position in the hood, bonnet or brush holder in a manner similar to that of the jet stripper illustrated in FIG. 2.

The single jet stripper is positioned and aligned so as to apply jets of air in a direction opposed to the trajectory of the wood particles as they are removed by the machining or routing operation. As illustrated in FIG. 6 the single jet stripper is aligned in the direction of the tool or routing bit and at an angle between about 20° and 30° from the tooled surface of the workpiece. This angle illustrated in FIG. 6 has been found to be acceptable for most routing operations. In this regard, it is clear from FIG. 6 that a lesser or greater angle may be selected depending on the exact position of the jet on the hood, bonnet or brush holder.

In addition to properly aligning the single jet stripper (13) in relationship to the workpiece, as illustrated in FIG. 5, the arrangement of the individual nozzles (10) which form the single jet stripper are back staggered to form a jet face with an approximate equal distance of the tubes from the routed or tooled workpiece. In this regard, as illustrated in FIG. 5, the individual nozzles (10) have different lengths which are arranged so that the free ends of the nozzles (10) substantially define an angle of approximately 30 degrees.

As in the case of the previously discussed embodiment, the specific dimensions of the elements, including the number of nozzles (10) utilized to form the single jet stripper will be dependent on the size of the hood, bonnet or brush holder forming part of a vacuum exhaust. In the illustrated example which has been found to be suitable for most general routing operations the single jet stripper (13) included 18 nozzles (10) which had an outer diameter of approximately 0.125 inches and were formed with outlet orifices having an inside diameter of approximately 0.032 inches. This exemplary embodiment as shown in FIG. 5 was supplied with pressurized air of approximately 5 PSI which is blown under about 30° from the workpiece with the nozzles positioned approximately 0.25 inches from the work area.

As in the case of the previously discussed embodiment, it is noted that although the individual tubes used in forming the single jet stripper are illustrated as being tubular, it is foreseeable that any cross-sectional shape can be effectively used. Additionally, although FIG. 5 shows the illustrative embodiment to include a manifold having a trapezoidal shape, other shaped manifolds such as circular, rectangular, square, etc., can be effectively utilized in place thereof.

Thus, the present invention relates to a dust collecting assembly for use with a machine tool which has a rotating tool bit. In this embodiment it includes means for applying a plurality of parallel jets of air in the direction of the tool bit positioned at an angle of about 20 to 30° from a tooled surface of a workpiece formed by the machine tool (FIG. 6).

The means for applying the jets of air includes a plurality of nozzle members (10) that are connected to a common manifold (11), which manifold (11) is connected to a suitable air supply. The number of nozzle members (10) utilized can be between 3 and 25 tubes, but should be at least 3. In one preferred embodiment, the number of nozzle members found to perform effectively was 18 nozzles.

In addition to being aligned with the workpiece, as discussed above, the plurality of nozzle members arranged on the manifold are (11) of such individual lengths and are arrayed so that their free ends substantially define an angle of approximately 30 degrees.

The number, alignment and size of the nozzles should be dependent on the size of the hood, bonnet or brush holder forming part of a vacuum exhaust. In a general embodiment suitable for most routing purposes each of the plurality of nozzle members (10) has an outer diameter of about 0.125 inches and outlet ends which have a reduced diameter of about 0.032 inches.

The dust collecting assembly of the present invention is designed to be utilized in conjunction with a machine tool which has an exhaust means for removing work particles and a hood or bonnet and/or brush assembly that surrounds the tool bit. In a preferred embodiment, the hood or bonnet is made from a transparent material in order to allow visual observation of the tooling or routing.

In an embodiment for use in multi-directional tooling or routing (FIGS. 3*a*, *b*) the dust collector assembly includes a plurality of tube members (6) which are positioned to substantially surround the tool bit and means to selectively apply air pressure to at least one of the tubes. Preferably the means to supply air pressure should supply air to between 1 and 3 tubes via segmented manifolds (7) and pneumatic servo valves (8) controlled by a computer signal.

The number of tubes that surround the work area should be 4 or more tubes and for general purposes about 24 tubes.

The plurality of tubes (6) are each supported at one end thereof by a brush holder, hood or bonnet assembly of the machine tool. The tubes have lower, depending ends which include first and second opposing planar faces (2, 3) with at least one of the face (3) being formed at an angle of between about 30° and 70°, and preferably about 55°, from the plane of the work piece and having a plurality of through holes (4) therein.

In general, the present invention provides a method for removing work particles from a workpiece during a tooling or machining operation which comprises applying a plurality of jets of air to each particle, along a direction that is substantially opposed to the trajectory of the particle as it is removed by the tooling machining operation, so as to slow the particles down, and removing the particles by means of a vacuum exhaust system.

For use in the multi-directional tooling or machining operations the method may utilize a plurality of tube members which are positioned to substantially surround a tool bit used in the tooling operation, and the plurality of jets of air are applied from subgroups of selected ones of the plurality of tube members (6), depending on the direction of the tooling operation (FIG. 2).

The invention has been described herein with reference to certain preferred embodiments. However, as obvious variations thereon will become apparent to those skilled in the art, the invention is not to be considered as limited thereto. In this regard, it has been noted above that various dimensions, shapes, alignment, etc. of the elements may depend upon the size of the hood, bonnet or brush holder forming part of a vacuum exhaust. However, such variations are nevertheless restricted to the requirement of directing the jets of air in a direction that opposes the trajectory of particles as they are removed by the particular tooling or routing operation.

It is to be understood that the present invention is particularly designed to be utilized in conjunction with a variety of machine tools including, but not limited to routers, milling machines, grinders, sanders, drills, etc., which utilize rotary cutting knives, rotary bits, tool bits, drill bits, saw bits, shaping cutters, sanding wheels, grinding wheels or other similar rotating tool means.

The dust collecting assembly of the present invention is further designed to supplement and be used in conjunction with conventional vacuum exhaust heads, hoods, bonnets, brushes, guards, and the like, which are designed to contain, collect, and/or remove work particles from a work area.

Although the invention has been described with reference to particular means, materials and embodiments, from the foregoing description one skilled in the art can easily ascertain the essential characteristics of the present invention, and various changes and modifications may be made to adapt the various usages and conditions without departing from the spirit and scope of the present invention as described in the claims that follow.

We claim:

1. A dust collecting assembly for use with a machine tool having a rotating tool bit and a work table, comprising means for applying a plurality of parallel air jets in the direction of the tool bit, parallel to the work table and opposite the trajectory of particles as they are removed by the machining or routing operation.

2. The dust collector assembly of claim 1, wherein the means for applying the plurality of air jets parallel to the work table applies said jets at a radial angle of between about 20 and 30 degrees with the tooled plane of a workpiece formed by said rotating tool bit.

3. The dust collector assembly of claim 1, wherein the means for applying the air jets comprises a plurality of nozzle members, one common manifold and an air feed tube, the nozzle members being connected to the common manifold, and the manifold being connected to the air feed tube.

4. The dust collector assembly of claim 3, wherein the plurality of nozzle members comprise 5 to 25 nozzles.

5. The dust collector assembly of claim 3, wherein the plurality of nozzles are arranged on the manifold and are of a length such that their free ends substantially define an angle of between about 20° and 30° with a tooled plane of a workpiece formed by said rotating tool bit.

6. The dust collector assembly of claim 3, wherein each of the plurality of nozzles has an outer diameter of about 0.125 inches and an outlet end which has a reduced diameter of about 0.032 inches.

7. The dust collector assembly of claim 3, wherein the machine tool further comprises a head, bonnet or brush holder; and the plurality of nozzles are located adjacent the work table on the periphery of the hood, bonnet or brush holder.

8. The dust collector assembly of claim 1, wherein the machine tool further comprises an exhaust means for removing work particles; and a hood and brush assembly that surrounds the tool bit.

9. A dust collector assembly for use with a machine tool having a rotating tool bit, a hood, bonnet or brush holder and a work table, comprising a plurality of tube members which entirely surround the tool bit, the tube members being positioned to blow air at 40° with the tangent of the hood, bonnet or brush holder, wherein only one or a group of tube members are operating at any one time during routing by blowing air in a direction opposite the trajectory of the particles; and means to selectively apply air pressure to at least one of the tube members.

10. The dust collector assembly of claim 9, wherein the plurality of tube members comprises 4 or more tubes.

11. The dust collector assembly of claim 10, wherein the plurality of tube members comprises 24 tubes.

12. The dust collector assembly of claim 9, wherein each one of the plurality of tubes is supported at one end thereof by a brush holder assembly of the machine tool and has lower, depending ends that include first and second opposing planar faces, with one of said faces being formed at an angle of between 30 and 70 degrees with the tooled plane of a workpiece formed by said rotating tool bit and having a plurality of through-holes therein.

13. The dust collector assembly of claim 9, further comprising a pressurized air supply for the plurality of tubes and operably connected thereto; and pneumatic servovalves energized by signals from a computer, the air supply being controlled by the pneumatic servovalves.

14. The dust collector assembly of claim 12, wherein said one of said faces is formed at an angle of about 55° with the plane of the workpiece.

15. The dust collector assembly of claim 9, wherein the machine tool further comprises an exhaust means for removing work particles; and a hood and brush assembly that surrounds the tool bit.

16. A method for removing work particles from a workpiece during a routing operation, comprising applying a plurality of air jets along a direction substantially opposite the trajectory of any particles being removed by the routing operation in order to slow said particles down wherein said plurality of air jets comprise either a plurality of parallel air jets or one or more desired air jets selectively activated from a group of air jets; and removing the particles by means of a vacuum exhaust means.

17. The method for removing work particles of claim 16, wherein the plurality of air jets is applied from a plurality of tube members.

18. The method of removing work particles of claim 17, wherein the plurality of tube members is supported by a hood and brush assembly which communicates with the vacuum exhaust means.

* * * * *